Aug. 18, 1959  J. N. GRAEF  2,899,880
PHOTOFLASH APPARATUS AND CIRCUIT
Filed April 1, 1955

INVENTOR.
JOHN N. GRAEF
BY
John W. Michael
ATTORNEY

United States Patent Office 2,899,880
Patented Aug. 18, 1959

2,899,880
PHOTOFLASH APPARATUS AND CIRCUIT

John N. Graef, Milwaukee, Wis., assignor to David White Company, Milwaukee, Wis., a corporation of Wisconsin Application April 1, 1955, Serial No. 498,640

8 Claims. (Cl. 95—11.5)

This invention relates to photo flash apparatus and a circuit therefor. The invention relates to a battery-capacitor circuit, commonly referred to as a B-C circuit, having provision for a wide range of functions making the apparatus and circuit extremely versatile.

An object of this invention is to provide an extremely versatile B-C flash system.

The broad advantages of the B-C photoflash are now well known. The circuits employed come under two general classes, the first being the closed circuit system where the capacitor is connected across the battery at all times and the second class being the open circuit system where the flash lamp comprises part of the capacitor charging circuit with the charging current limited by a series resistor, to a value below that required to fire the lamp. The present circuit is of the open circuit type but includes means for testing the entire synchronizing system including the camera shutter, means for testing the bulb alone, means for open flash firing of the lamp, and the usual firing circuit through the camera shutter switch.

Another object of the invention is to provide simple yet versatile flash apparatus.

The basic unit incorporates a test light which gives a visual indication of the two test circuits mentioned above. The test circuits and hand flash are controlled by a simple switch arrangement biased to a normal position closing the usual firing circuit.

Other objects and advantages will be pointed out in, or be apparent from, the specification and claims, as will obvious modifications of the single embodiment shown in the drawings in which:

The essential elements of the B-C flash system of the present invention are in practice mounted on and housed within a base unit but the internal arrangement of the battery, capacitor, resistor, test bulb and wiring in the base unit is of no particular importance in so far as the present invention is concerned. Obviously the arrangement of the parts, etc. can take a number of forms. The important feature, however, is the arrangement of the circuit itself together with the switching provided to obtain the various functions. Figs. 1 through 5 give various wiring diagrams in each of which a different function performed by this flash gun is shown in solid lines with the remainder of the circuit being in dotted lines. It will be appreciated, of course, that in all instances, the circuit elements remain in the flash gun, but that the operative portion of the circuit is changed by the switching.

Figure 1:
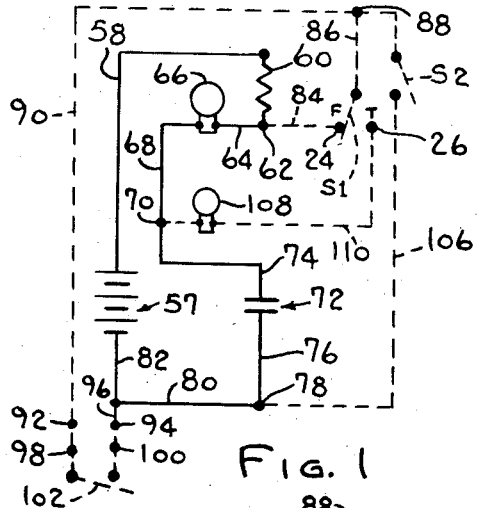
Fig. 1 is a wiring diagram with the capacitor charging circuit shown in solid lines.
Figure 2:
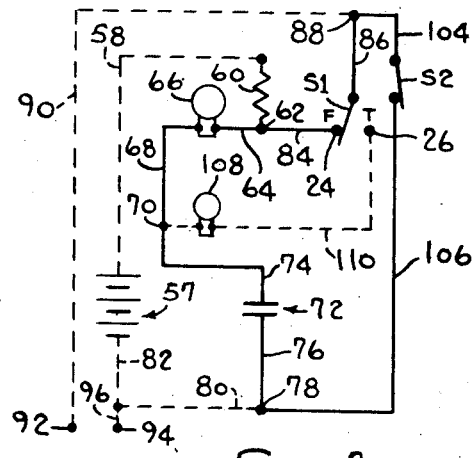
Fig. 2 shows the circuit with the open flash circuit in solid lines.
Figure 4:
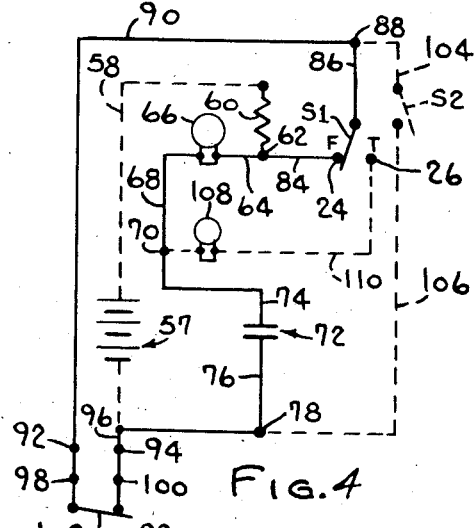
Fig. 4 shows the flashing circuit when using the shutter contacts.

Referring first to Fig. 1, the flow from battery 57 goes through wire 58, resistor 60 to junction 62, through lead 64 to the flash bulb socket where the current flows through the filament in flash bulb 66, through lead 68 to junction 70 and thence to capacitor 72 through lead 74. The return from the capacitor to the battery passes through lead 76, junction 78 and leads 80, 82. This circuit constitutes the charging circuit. It will be noted that it is completed by the flash bulb 66. If there is no flash bulb in the circuit, the circuit is open and there is no drain on the battery. When the flash bulb is inserted into the circuit, current will flow through the flash bulb to charge the capacitor 72. The current flow rate is regulated by resistor 60 to a value less than that necessary to flash the bulb 66. In Fig. 4, it will be noted that switch S–1 is in contact with the "F" or 24 contact to complete a circuit including the capacitor, the flash bulb, the lead 84 from junction 62, lead 86 running to junction 88 and lead 90 terminating in contact 92. The other contact 94 is connected to lead 80 by means of a lead 96. This is the normal capacitor discharge path which is employed to flash the bulb 66 with the camera shutter. The contacts 92, 94 represent the contacts in the accessory clip 14 on the flash gun and which are, in turn, connected to contacts 98, 100 in the accessory shoe on the camera to place the shutter switch 102 in the circuit. Thus, as may be seen in Fig. 4, when the shutter switch 102 is closed, the capacitor is shorted across the flash bulb 66 to ignite the bulb.

If, however, it is desired to flash bulb 66 with the flash gun not attached to the camera or in any way regulated by the camera shutter switch, the switch S–2 may be closed to short across junctions 78, 88 by means of leads 104, 106. Closure of switch S–2, therefore, may be employed when open or hand flash is desired.

Figure 3:
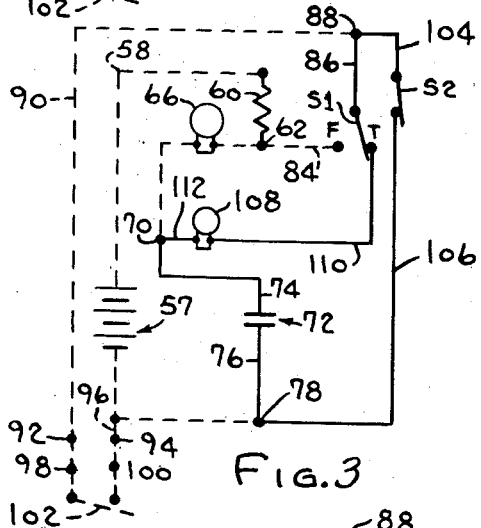
Fig. 3 shows the circuit used in testing the flash bulb.

Referring now to Fig. 3, it will be noted that switch S–1 has been moved to the "T" or 26 contact which effectively takes the flash bulb 66 out of the discharge circuit and substitutes test bulb 108 therefor. The test bulb 108 may be of the incandescent type. The bulb socket is connected to switch contact 26 by lead 110 and is connected to junction 70 by lead 112. As shown in Fig. 3, the switch S–2 is closed which shorts the capacitor across the test bulb 108. With the switches so positioned, the circuit acts to test the flash bulb. If the flash bulb is good, the circuit will charge and when the switches are actuated as shown in Fig. 3, the circuit will discharge through the test bulb 108 which will give a visual indication that the capacitor discharged. This proves the flash bulb is good since the capacitor could not build up a charge without the flash bulb being good.

Figure 5:
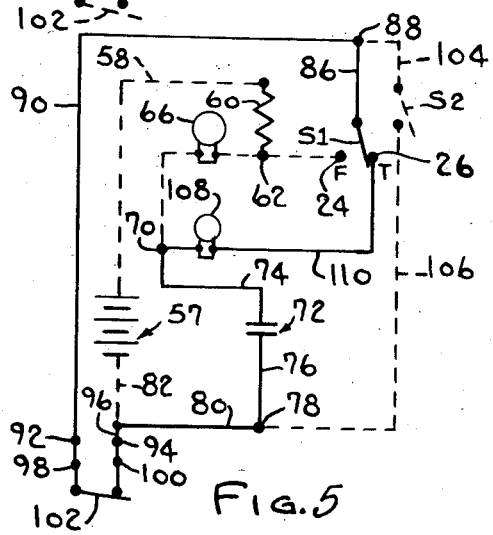
Fig. 5 shows the circuit used to test the bulb and all connections including the camera circuit.

If the switch S–2 is left open with the switch S–1 moved to the "T" contact as shown in Fig. 5, then a discharge circuit is available with the test bulb substituted for the flash bulb and with the circuit controlled by the shutter switch. When the shutter switch 102 closes, as shown in Fig. 5, the circuit is completed and the capacitor, if charged, will discharge through the test bulb. This serves as a test not only of the quality of the flash bulb which must be good in order to charge the capacitor, but also as a test of the entire wiring circuit including the contacts in the shutter, etc. This is true since the entire circuit here includes the essentials of the operating circuits of the flash gun. Therefore, with switch S–1 in the "T" position tripping the camera shutter will determine whether the entire system including the shutter mechanism is in operating condition.

Figure 6:
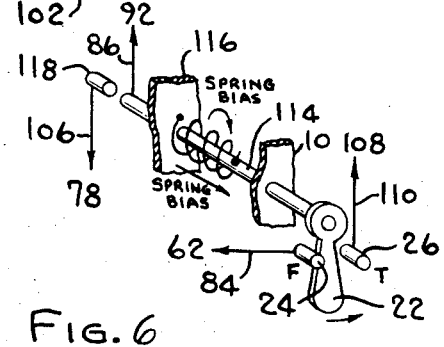
Fig. 6 is a schematic showing of the switching arrangement.

The above mentioned switching function can be readily accomplished on the present flash gun. While the exact details of the internal wiring and switching effected by operation of switch 22 are complicated, they can be readily simplified to a schematic showing such as in Fig. 6. In this figure, the manually operable metal arm 22 is shown projecting through the side wall of the flash gun base 16 and mounted on metal shaft 114. Wire 86 is connected to shaft 114. The inner end of shaft 114 is also journaled in some member such as piece 116. A coil spring concentric with shaft 114 acts thereon to urge the arm 22 outwardly and in a clockwise direction as seen in Fig. 6. This is accomplished by fixing the spring with respect to member 116 and to shaft 114 after having first stressed the spring by coiling it more tightly. In the position to which the spring biases the arm 22 it abuts member or contact "F," to which wire 84 is connected, to complete the normal circuit. If the switch is moved against the spring bias over to contact member "T," the circuit through wire 110 leading to test bulb 108 will be completed. In either the "F" or "T" position of switch 22, the switch may be moved in against the bias of the spring to close switch S-2 by moving shaft 114 against the contact 118 to which wire 106 leading to junction 78 is connected. The movement of the switch S-1 from "F" to "T" is simply effected by a rotary motion of the arm 22 on shaft 114. Closure of the switch S-2 is simply effected by moving the arm inwardly. It will be appreciated that the switch S-2 can be closed in either the "F" or "T" position of the switch S-1.

While of no importance so far as the invention herein claimed is concerned the specified components for this flash gun are as follows: 22½ volt "B" battery; 250 mfd. 25 volt capacitor; 2500 ohm ¼ watt resistor; and a 2.4 volt miniature bulb (for the test bulb).

Although but one embodiment of the present invention has been illustrated and described, it will be apparent to those skilled in the art that various changes and modifications may be made therein without departing from the spirit of the invention or from the scope of the appended claims.

I claim:

1. A B-C photoflash circuit adapted for use with internally synchronized camera shutters provided with shutter contacts, comprising a charging circuit including a battery, a capacitor, a resistor, and a flash bulb in series and comprising the only circuit available for charging the capacitor, a switch, a flash circuit including said capacitor and said flash bulb and said switch and terminating in electrical contacts adapted for connection to shutter contacts, means for shorting said shutter contacts to short the capacitor across the flash bulb when said switch is closed, said switch normally closing the flash circuit, a hand flash circuit operative to short the capacitor across the flash bulb independently of said circuit contacts, switch means for manually closing the hand flash circuit, an incandescent test bulb, and means for substituting the test bulb for the flash bulb in the flash circuit but not in the charging circuit whereby operation of the shutter will flash the test bulb if the entire circuit and flash bulb are good.

2. A B-C circuit according to claim 1 including means for completing a circuit shorting the capacitor across the test bulb without shorting said circuit contacts to test the condition of the flash bulb only.

3. B-C flash apparatus mounted in a body and including the circuit defined in claim 4 in which said switch and said switch means are operated by a single arm projecting from the body, said arm being mounted in the body for rotary and reciprocatory motion, means biasing the arm to a position in which said switch is closed and said switch means are open, reciprocatory movement of said arm towards the body being operative to close said switch means.

4. B-C flash apparatus according to claim 3 in which said substituting means includes said switch, and predetermined rotary motion of the arm against said biasing means is operative sequentially to actuate the switch to open the flash circuit including the flash bulb and to connect the test bulb in the flash circuit.

5. A B-C flash circuit of the open type wherein a battery, a capacitor, a resistor, and the flash bulb are in series in a charging circuit and having a flash circuit terminating in electrical contacts adapted for connection to the synchronizing circuit in a camera having shutter controlled contact means for shorting said contacts in response to actuation of said camera shutter to short the capacitor across the flash bulb, a normally open test circuit including the capacitor and a series connected test bulb of the incandescent type, with the flash bulb and the test bulb connected to the capacitor in parallel relation, switch means normally closing the flash circuit and operable to open the flash circuit through the flash bulb and to close the test circuit through the test bulb independently of said flash bulb, and a second switch normally open and operable to close a shorting circuit across the capacitor and flash bulb independently of said first mentioned contacts.

6. A B-C circuit according to claim 5 in which the switch means includes two contacts one of which is included in the flash circuit and the other of which is included in the normally open test circuit, and circuit connections between the second switch and said two contacts whereby the said switch means and the second switch operate jointly to discharge the capacitor selectively through the flash bulb or through the test bulb.

7. In a B-C flash circuit of the open circuit type in which the flash bulb completes a charging circuit including a battery, a capacitor and a resistor in series and which is provided with a flash circuit terminating in electrical contacts adapted for connection to camera shutter controlled contacts, means for shorting said contacts in response to actuation of said camera shutter to short the capacitor across the flash bulb, a test bulb of the incandescent type, normally open circuit means for connecting the test bulb in series with the capacitor and in parallel relation to the flash bulb, switch controlled means for closing the circuit through the test bulb and capacitor in the flash circuit, and for opening the circuit through the flash bulb, and circuit means including an additional switch for shorting the capacitor across either the flash bulb or the test bulb independently of said contacts.

8. A B-C flash circuit of the open type in which the flash bulb completes a series charging circuit including the flash bulb, a capacitor, a battery, and a resistor; a flash circuit terminating in contacts adapted to be shorted by an internally synchronized camera shutter to short the capacitor across the flash bulb, said flash circuit including a first branch containing the flash bulb and a second branch having a test bulb of the incandescent type connected therein, said flash circuit including a single pole double throw switch having contact means normally closing the flash bulb branch of the circuit in one position of the switch and said switch being operable to another position in which the flash bulb branch of the circuit is open and the test bulb branch of the circuit is closed whereby, shorting said contacts with the switch in said second position, discharges the capacitor across the test bulb to test the entire circuitry including that in the camera independently of the flash bulb, and a normally open circuit including a second switch which when closed is operative to short the capacitor across either the flash bulb or the test bulb depending upon the position of the first switch.

References Cited in the file of this patent

UNITED STATES PATENTS

| | | |
|---|---|---|
| 2,408,469 | Malloy | Oct. 1, 1946 |
| 2,486,010 | Edgerton | Oct. 25, 1949 |
| 2,553,662 | Marsal | May 22, 1951 |
| 2,638,764 | Schwartz | May 19, 1953 |
| 2,664,795 | Tone | Jan. 5, 1954 |
| 2,688,071 | Wright | Aug. 31, 1954 |
| 2,730,885 | Kaprelian | Jan. 17, 1956 |

OTHER REFERENCES

Kingdon: "The Capacitor in Captivity," The British Journal of Photography, vol. C, No. 4845, March 27, 1953, pg. 160.

UNITED STATES PATENT OFFICE
CERTIFICATE OF CORRECTION

Patent No. 2,899,880                          August 18, 1959

John N. Graef

It is hereby certified that error appears in the printed specification of the above numbered patent requiring correction and that the said Letters Patent should read as corrected below.

Column 3, line 58, claim 3, for the claim reference numeral "4" read -- 1 --.

Signed and sealed this 15th day of March 1960.

(SEAL)
Attest:

KARL H. AXLINE
Attesting Officer

ROBERT C. WATSON
Commissioner of Patents